United States Patent [19]
Yasutake

[11] Patent Number: 5,945,671
[45] Date of Patent: Aug. 31, 1999

[54] SCANNING PROBE MICROSCOPE AND MICRO-AREA PROCESSING MACHINE BOTH HAVING MICRO-POSITIONING MECHANISM

[75] Inventor: Masatoshi Yasutake, Chiba, Japan

[73] Assignee: Seiko Instruments Inc., Japan

[21] Appl. No.: 08/800,074

[22] Filed: Feb. 12, 1997

[51] Int. Cl.⁶ .................................................. H01J 37/00
[52] U.S. Cl. ................. 250/306; 250/442.11; 250/443.1
[58] Field of Search ........................... 250/442.11, 443.1, 250/306, 307

[56] References Cited

U.S. PATENT DOCUMENTS

| | | | |
|---|---|---|---|
| 3,678,270 | 7/1972 | Braun et al. | 250/442.11 |
| 4,590,380 | 5/1986 | Tamaki | 250/442.11 |
| 4,947,042 | 8/1990 | Nishioka et al. | 250/442.11 |
| 5,103,174 | 4/1992 | Wandass et al. | 324/244 |
| 5,808,302 | 9/1998 | Binnig | 250/306 |

*Primary Examiner*—Bruce C. Anderson
*Attorney, Agent, or Firm*—Adams & Wilks

[57] ABSTRACT

A scanning probe microscope has a probe for measuring the shape of a sample surface and various physical properties of the sample, and a micro-positioning mechanism for positioning the sample proximate the probe. The micro-positioning mechanism has spring elements for effecting fine movement of the sample in a predetermined direction toward the probe, an electromagnetic power generating mechanism for driving the spring elements, a support mechanism mounted for movement in the predetermined direction and having a support member supported through a viscous element for effecting coarse movement of the sample in the predetermined direction, and a heating mechanism for heating the viscous element.

25 Claims, 4 Drawing Sheets

FIG. 5
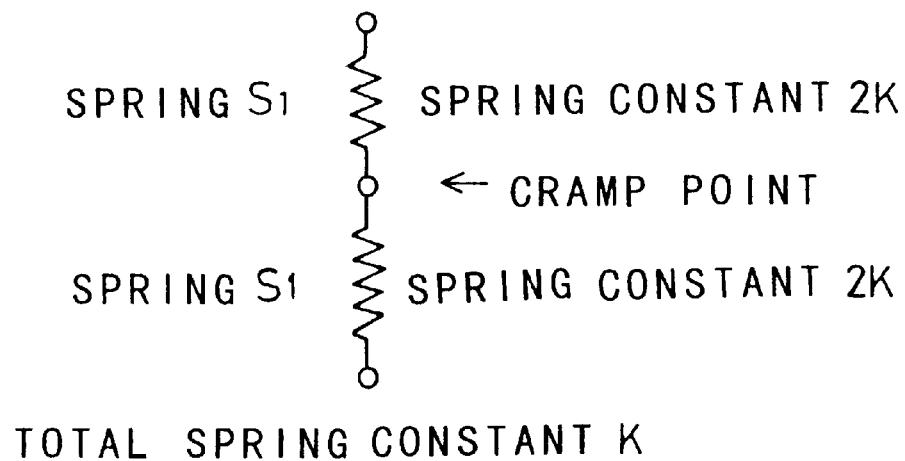
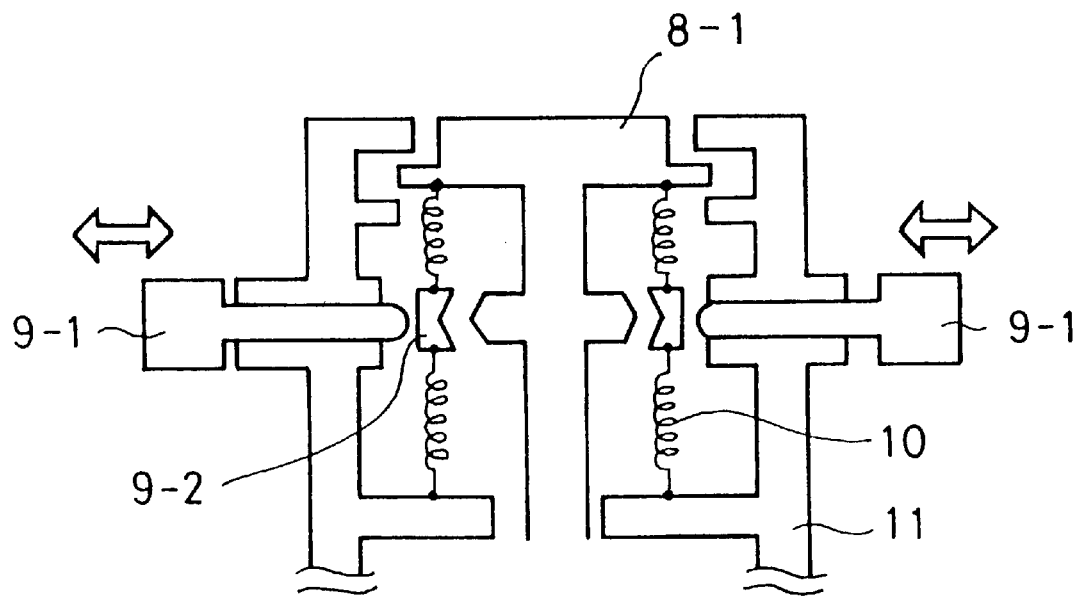
FIG. 6

SCANNING PROBE MICROSCOPE AND MICRO-AREA PROCESSING MACHINE BOTH HAVING MICRO-POSITIONING MECHANISM

BACKGROUND OF THE INVENTION

The present invention relates to a positioning mechanism for approaching a sharp probing tip towards a surface of a sample without damaging the probing tip, which probing tip is used as a sensor of a scanning probe microscope to measure a shape of surface and various physical quantities (electric potential, magnetism, friction, capacitance, and so on) of a sample, or used as a working needle of a micro-area processing machine for processing a sample surface by approaching the probing tip within several mm to several Å from the sample surface.

The conventional SPM (Scanning Probe Microscope), as shown in FIG. 2, comprises two motion mechanisms in the vertical direction(z direction). Those are a coarse motion mechanism 6 and a fine motion mechanism 5. The coarse motion mechanism 6 is an approaching mechanism for approaching a probe 20 relatively within a distance of Å order above a sample 3 after beginning to start moving from a position of several mm above the sample surface. The fine motion mechanism 5 is a controlling mechanism for controlling a distance between the probing tip and the sample surface at accuracy of Å order to maintain constant a physical quantity such as an atomic force or a tunneling current occurring between the probe and the sample and thereby to measure a three-dimensional shape of the sample surface or various physical quantities (electric potential, magnetism, friction, capacitance, and so on) of the sample. For example, some of the coarse motion mechanisms comprise a pulse motor and a differential screw mechanism, and others comprise a pulse motor, a screw mechanism and a lever mechanism. The fine motion mechanism 5 usually comprises a Piezo element which drives the sample according to a supplied voltage. Therefore, since the conventional SPM needs a pulse motor and complex, precise screw and displacement reduction mechanism, and a Piezo element and a high voltage source for the Piezo element drive, it becomes an expensive structure. As there is a tradeoff between a moving range (dynamic range) of XYZ of the Piezo element and resolution, the whole Piezo element should be changed according to the measuring range. As the supplied voltage between electrodes of the Piezo element is very high, i.e. several hundred to a thousand voltage, it needs to shield a circumference of the Piezo element and to form a protection circuit for falling voltage when the cover of the device is opened. Especially at measurement of the sample in solution, current leakage between electrodes of the Piezo element easily causes a problem. As a supply voltage vs. displacement characteristics is nonlinear, another displacement sensor (for example, capacitance displacement sensor, strain gauge, and so on) is needed in order to measure accurate displacement (within 3% accuracy in the whole measuring range.)

It is desirable that a distance between the sample and the probe is more than several mm in case of changing the sample or the probe. When the probe is far from the surface of sample, the probe approaches at high speed, and when the probe approaches near the surface of sample, the speed is changed to low and the probe approaches the nearest position in order to approach measurement area in short time. For detecting the switching point from high speed to low, speed a long distance force acting between a sample and a probe (vibration amplitude of a cantilever attenuates by air resistance when the cantilever approaches the surface of sample) can be detected and change of speed can be carried out as shown in, or example, Japanese Opened Pat. H06-74745. A speed switching point can be determined by using the focal length of the objective lens of the optical microscope as shown in Japanese Opened Pat. H03-40355. In both Z coarse action systems, a motor and a screw, or a reduction system using a lever are used in the driving system. The moving distance for each one step is about 5 nm. Even at this distance, the last step is too long to control the distance between the surface of sample and the probe at accuracy of Å level. In order to protect from contact of the sample and the probe, a sample table should be moved several nm. This is the distance which the Z coarse action drive system stops after making Z servo system including a Piezo element under the sample table active. At that time, the moving speed of the Z servo system must be higher than the rising time of one step of a motor. A detection of the end of Z coarse driving system is carried out by attenuation of vibrating amplitude or bend of a cantilever.

The present invention relates to Z coarse action and Z fine action of a scanning probe microscope. As the Z coarse action and the Z fine action are carried out by one driving device, the Z driving mechanism is simplified and the elements reduced as compared to the prior art mechanism. In Z coarse action, feed can be adjusted by stepless motion and the probe can approach the surface of the sample several mm to several Å without damaging the probe. In Z fine action, the dynamic range can be varied by the switching mechanism.

SUMMARY OF THE INVENTION

FIG. 1 is a view showing a united constitution of a Z coarse motion and Z fine motion system for solving the problem in the prior art. The Z driving system 100 comprises a direct acting power generating mechanism like voice coil motor used as a power generating means, a Z coarse motion controller which has a housing filled with a viscid body and a heating mechanism to heat the viscid body, and a Z fine motion controller which has a spring element driven by said direct acting power generating mechanism. Although displacement sensor (cantilever) 2, displacement detecting mechanism 1, and others are not shown in the figure, a closed loop is comprised of a displacement detector controller and a Z axis servo system. Force applied to the spring element composing of the Z fine motion controller is controlled by current supplied in the voice coil so as to maintain constant a physical quantity such as a power, a tunneling current acting between the deflection sensor such as a cantilever-type spring and the sample. The results of the scanning probe microscope scan are displayed by plotting the drive currents as a set of curves representing three dimensions.

BRIEF DESCRIPTION OF THE DRAWINGS

FIG. 5 is an illustration showing a cramp mechanism of the spring element; and

FIG. 6 is a detail view showing a construction of a cramp mechanism of the spring element.

DETAILED DESCRIPTION OF THE PREFERRED EMBODIMENT

Figure 1:
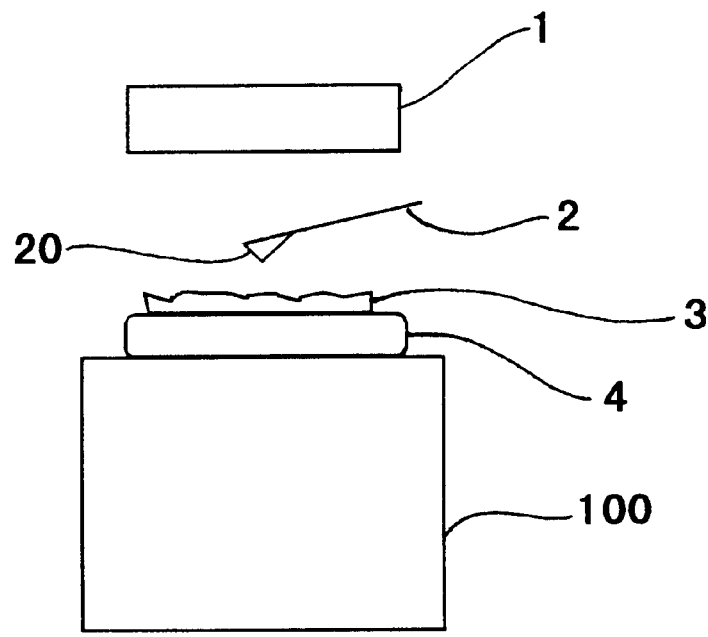
FIG. 1 is a schematic view showing a constitution of Z coarse action and Z fine action of a scanning probe microscope according to the present invention.
Figure 2:
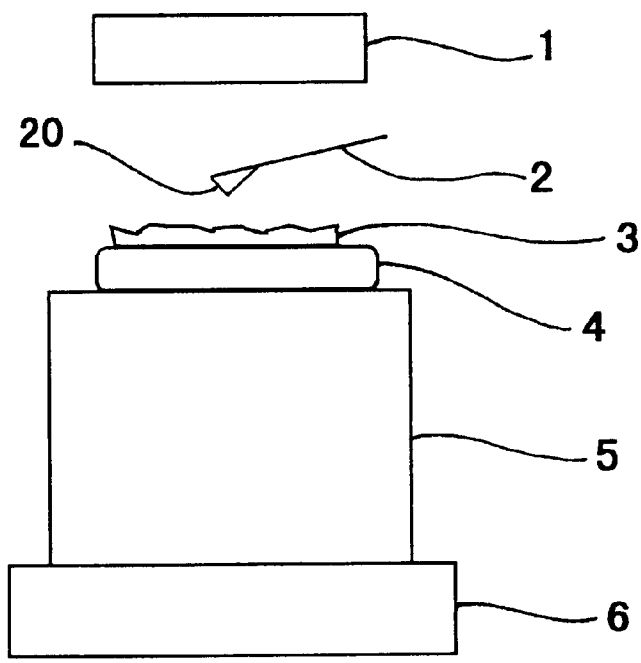
FIG. 2 is a schematic view showing a constitution of Z coarse action and Z fine action system of the prior art scanning probe microscope.
Figure 3:
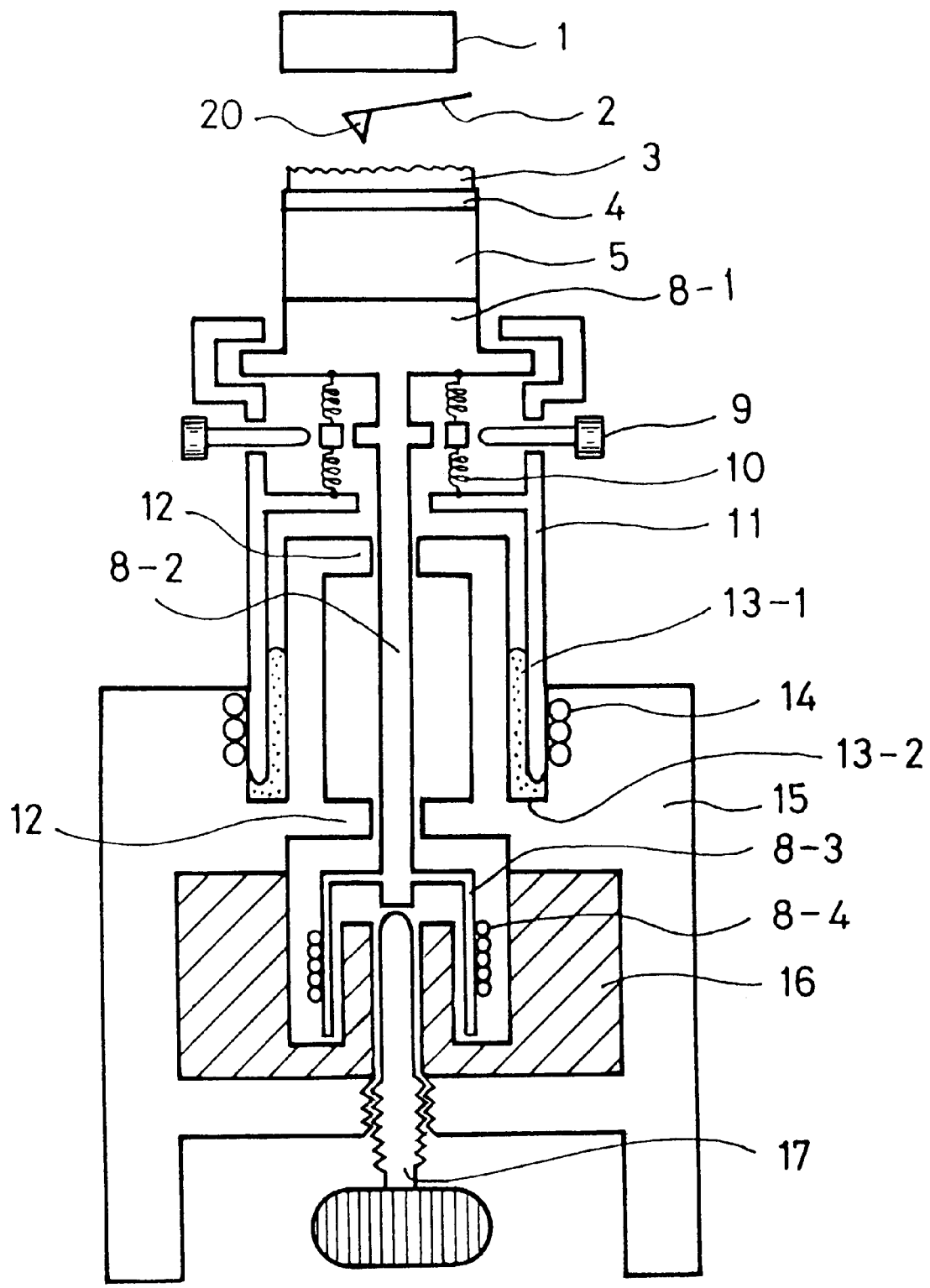
FIG. 3 is a detail view showing a construction of a Z driving mechanism of a scanning probe microscope.
Figure 4:
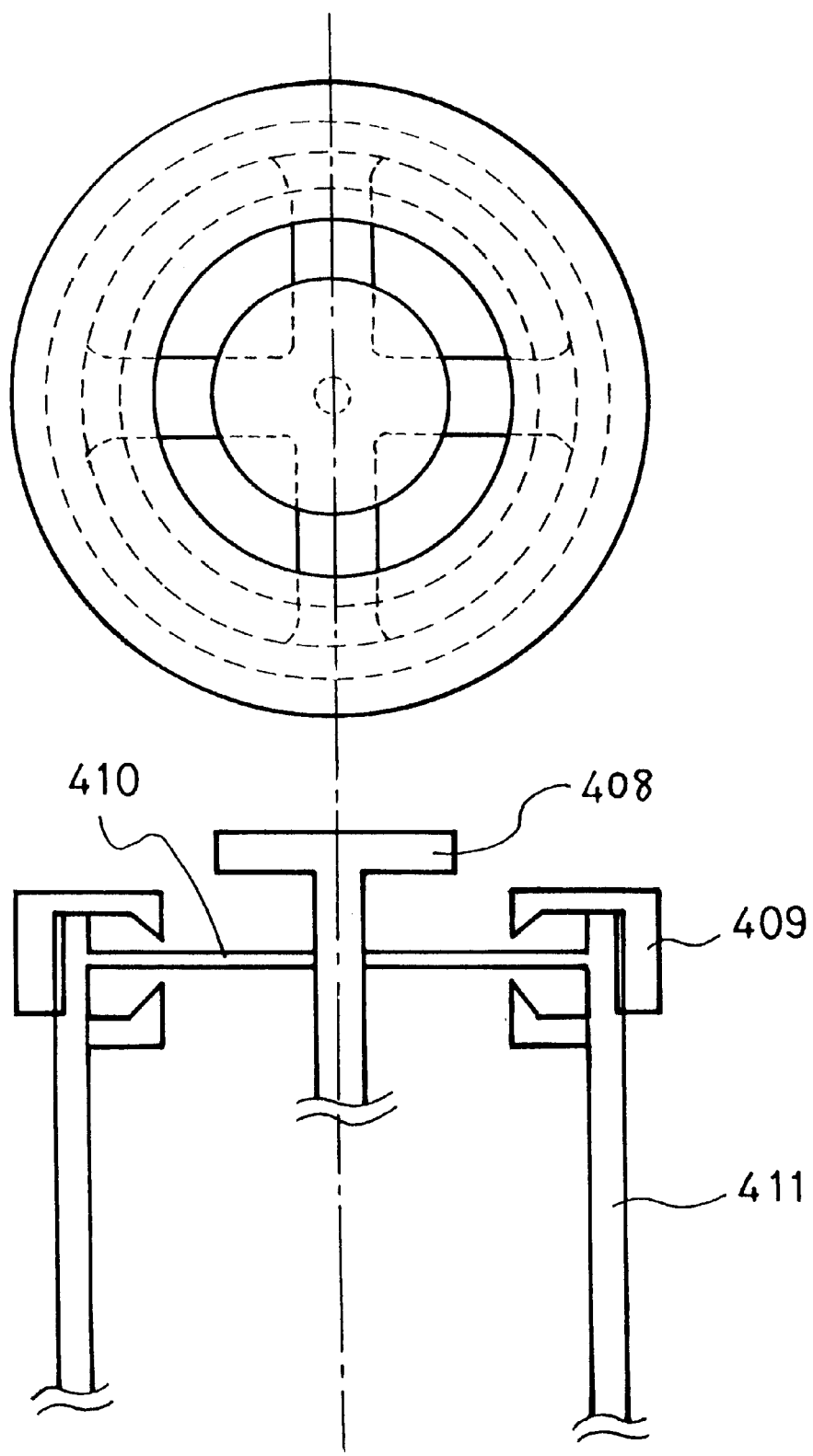
FIG. 4 is a view showing a cramp mechanism of a spring element.

FIG. 3 is a view of a Z driving mechanism having both Z coarse motion function and Z fine motion function according to the present invention. In the constitution of the Z driving mechanism, there is a two dimensional scanner(positioner) such as a piezo scanner under the sample 3 driving the sample 3 finely in XY directions. Alternatively, the two dimensional scanner may be attached to a deflection sensor (cantilever-type spring) 2 and acts on the deflection sensor 2. A probe 20 is formed at the end portion of the cantilever. Under the fine action system, there are provided an upper spindle portion (a sample table fixing portion) 8-1 moving the sample table vertically, a central spindle portion 8-2, and a lower cylindrical spindle portion 8-3. A coil 8-4 is wound around the lower cylindrical spindle portion 8-3, and forms a voice coil motor used for speakers with a magnet 16. Spindle 8 is supported by bearings 12 of base portion 15. A constant current source, not shown in the figure, is attached to coil 8-4 and is controlled by a coil current controller. Therefore, a magnetic force in proportion to current flowing through the coil acts on the lower cylindrical spindle portion 8-3 and the current is read into analyzing means such as a computer as a quantity corresponding to a displacement quantity of the sample or the probing tip(the sample surface structure). Under the lower portion of the spindle 8-3, a position adjusting screw 17 acting on the lower portion of spindle 8-3 is provided and regulates the moving range of Z coarse action of the sample 3. Between the upper portion of spindle 8-1 and tube 11, a spring element 10 is fixed and the length of the spring element can be varied by a spring cramp 9. Therefore, the spring constant of spring element 10 is variable. A coil spring is used for the spring element 10 in FIG. 3. Alternatively, a cross type blade spring can be used as shown in FIG. 4. Upper portion of spindle 408, cross type blade spring 410, and spring cramp 410 are shown in FIG. 4. Here, the length of the blade spring can be varied by the cramp of the blade spring 410, so that a spring constant is variable. In FIG. 3, tube 11 is coupled to base portion 15 through a viscid body 13-1 filled up in a viscid body housing 13-2, the viscid body being a polymer such as ethylene glycol. A heater 14 to heat the viscid body is connected to a temperature controller which is not shown in FIG. 3. Cantilever 2 having a probe at the end portion and displacement detector 1 to detect deflection of the end portion of the cantilever are provided above sample 3, and a displacement signal controller coupled to the displacement detector, not shown in the figure, detects displacement of the tip of the probe 20 as an electric quantity.

Next, operation of the Z driving mechanism will be described. First, Z coarse action operation will be explained. When the surface of the sample is far from the probe at first, heater 14 is heated by switching on the temperature controller, and viscosity of viscid body is reduced. For example, in case of a polymer, the temperature is set at its melting point or a little more than the transition point of glass. Second, a distance between sample 3 and cantilever 2 is adjusted using position adjusting screw 17 by view, and Z coarse action moving range is limited. Third, current I is built up in coil 8-4 by the constant current source. Force F0 occurs in the vertical direction to raise spindle 8 by magnetic field of external magnet 16 and current I. The force F0 pushes up tube 11 through spring element 10. Because viscosity of the viscid body is low, tube 11 moves easily. Moving speed can be varied in stepless motion by varying current I flowing through coil 8-4. Detection of the end of Z coarse action (to make current flowing through coil 8-4 zero) is carried out when the attenuation quantity of vibration amplitude of the cantilever or deflection quantity of the cantilever shown in the prior method comes over a set value. Temperature controller is switched off when the end of Z coarse action is detected. It is desirable that the switching-off is carried out at the switching time of the moving speed shown in the prior art considering remaining heat. When heating of heater 14 stops, viscosity of viscid body increases. Especially, in case of said polymer, solidification starts when the temperature comes under melting point or transition point of glass to fix tube 11 tightly on the base portion 15.

Next, Z fine action will be explained. Spindle 8 can move the sample table displacement $Xl=(Fl-mlg)/K$ by force F1. Here, ml is the sum of mass of spindle 8, sample 3, lateral scanning fine action system 5, sample table 4, and spring element 10, g is acceleration of gravitational force, and K is spring constant of spring element 10. Force (Fl) acting on spring element 10 of Z fine action portion, that is, current flowing through the voice coil motor, is controlled to keep constant a physical quantity (force) acting between probe 20 and sample 3 and thereby move the sample in a lateral direction at a constant value distance from the tip of probe 20, so that the path of the tip represents the sample surface structure. The current represent values equivalent to the raggedness shape of sample 3. Within elastic limit of spring element 10, as shown in the above equation, relation between displacement and force is linear. For example, when force of 10N acts on spring of $10^6$ N/m, displacement is about 10 $\mu$m, and when force of 1 N acts on the same spring, displacement is about 1 $\mu$m. If mass ml is 10 g, resonance frequency of Z fine action system is about 63 kHz which is good response speed in the Z direction.

Next, spring cramp making moving displacement of Z direction (dynamic range) will be described. When two coil springs S1 having spring constant 2K are connected in series like FIG. 5, spring constant of connected springs becomes K. Therefore, when the spring is cramped at middle point, spring constant becomes double. Thus, when the position of cramp is varied, spring constant K of spring element 10 fixed between upper portion of spindle 8-1 and tube 11 is changed, and displacement is varied by the equation $Xl=(Fl-mlg)/K$. Although dynamic range of Z direction becomes ½ when spring constant is 2K, force per displacement, that is current flowing through the voice coil, becomes double, and resolution reading displacement improves. In case of cross type blade spring shown in FIG. 4, spring constant becomes $K=WdEzT^3/L^3$. Here, Ez is Young's modulus, Wd is width of the blade spring, T is thickness of the blade spring, and L is length of the blade springs between upper portion of spindle 8-1 and tube 11. Therefore, spring constant K is variable by varying L. For example, when the spring length is the former length multiplied by 0.8, spring constant becomes double. FIG. 6 is a detail view of a cramp mechanism. Three springs 10 are hung by sample table fix portion 8-1 in each 120 degree. Cramp 9-2 of the middle of spring has concave or convex slits to cramp surely. The spring is fixed or unfixed by pushing the rear of cramp against the tube (having concave or convex slits) by expanding a moving member of spring cramp 9-1 with a solenoid. Thus, spring constant is variable by the signal from outside, and dynamic range and resolution reading displacement of Z direction are variable.

The temperature controller is switched on, heater 14 is heated, and viscosity of the viscid body is reduced again after the end of measurement. Next, letting current I through flow coil 8-4 in reverse direction to the last time from the constant current source, the sample table falls. After spindle 8 contacts with position adjusting screw 17, the temperature controller is switched off.

The present invention replaces the Piezo element, which is the prior art Z direction fine action element to a spring element. The Z direction coarse action mechanism of the present invention differs from pulse motor and screw and lever mechanism of the prior art to a housing filled up with viscid body and heater mechanism, and is united with said spring element. By the foregoing construction, the following effects of the present invention are obtained:

1) As Z driving mechanism is simplified and Z coarse action and Z fine action are comprised of one driving device, and the number of elements are reduced as compared to the prior art mechanism.

2) In Z coarse action, feed can be adjusted in stepless motion, and it is possible that the probe approaches the surface of the sample in several mm to several Å without damaging the probe.

3) In Z fine action, dynamic range can be varied by the spring constant switching mechanism. It does not need to change the prior art Piezo element.

4) The protecting circuit for falling voltage when the cover is opened is not required, and security improves because high voltage is not needed which is several hundred to a thousand V for electrodes of the Piezo element.

5) Although supply voltage vs. displacement characteristics of Piezo element is nonlinear and another displacement sensor (for example, capacitance displacement sensor, strain gauge, and so on) is needed for accurate measurement (within 3% accuracy in whole measurement range), supply voltage vs. displacement characteristics is linear when the spring element is used within elastic limit, and accurate measurement can be carried out without another displacement sensor.

What is claimed is:

1. A scanning probe microscope having a micro-probe for measuring the shape of a sample surface and various physical properties of the sample and being useable with a micro-area processing machine for processing the surface of the sample using the micro-probe, the scanning probe microscope having a micro-positioning mechanism having spring elements for effecting fine movement of the sample in a predetermined direction toward the micro-probe, an electromagnetic power generating mechanism for driving the spring elements, a support mechanism mounted for movement in the predetermined direction and having a support member supported through a viscous element for effecting coarse movement of the sample in the are determined direction, and a heating mechanism for heating the viscous element.

2. A scanning probe microscope according to claim 1; wherein the micro-positioning mechanism further comprises a cramp mechanism for varying a spring constant of the spring elements to thereby vary the range of fine movement of the sample in the predetermined direction.

3. A scanning probe microscope according to claim 2; wherein the cramp mechanism has a first cramp element connected to the springs, a second cramp element integrally connected to the support mechanism, and a moving member for biasing the first cramp element into contact with the second cramp element to vary the spring constants of the spring elements.

4. A scanning probe microscope according to claim 3; wherein one of the first and second cramp elements of the cramp mechanism has a concave surface and the other of the first and second cramp elements has a convex surface, the concave and convex surfaces contacting one another when the moving member biases the first cramp element into contact with the second cramp element to vary the spring constants of the spring elements.

5. A scanning probe microscope according to claim 4; further comprising driving means for driving the moving member to bias the first cramp element into contact with the second cramp element.

6. A scanning probe microscope according to claim 1; wherein the viscous element comprises a polymer.

7. A scanning probe microscope according to claim 4; wherein the polymer comprises ethylene glycol.

8. A scanning probe microscope according to claim 1; further comprising a temperature varying mechanism for varying the temperature of the heating mechanism to thereby vary the viscosity of the viscous element.

9. A scanning probe microscope according to claim 1; wherein the micro-positioning mechanism further comprises an adjusting mechanism for adjusting a distance between the sample and the probe in the predetermined direction to define a range of coarse movement of the sample in the predetermined direction.

10. A micro-positioning mechanism for positioning a probe relative to a sample by effecting coarse movement and fine movement of the sample in a predetermined direction, the micro-positioning mechanism comprising: a movable member for supporting a sample; a support member supported through a viscous element for effecting coarse movement of the sample in a predetermined direction toward a probe, the viscous element having a viscosity which is controlled to place the viscous element in a softened state or a hardened state; and biasing means for effecting fine movement of the sample in the predetermined direction, the biasing means being disposed between the movable member and the support member; wherein the viscous element is in the softened state during fine movement of the sample, and the viscous element is in the hardened state during coarse movement of the sample.

11. A micro-positioning mechanism according to claim 10; wherein the viscous element comprises ethylene glycol.

12. A micro-positioning mechanism according to claim 10; further comprising a heating device for heating the viscous element.

13. A micro-positioning mechanism according to claim 12; wherein the biasing means comprises a plurality of spring elements; and further comprising means for varying a spring constant of each of the spring elements for varying a range of fine movement of the sample in the predetermined direction.

14. A micro-positioning mechanism according to claim 12; further comprising adjusting means for adjusting a distance between the sample and the probe in the predetermined direction to define a range of coarse movement of the sample in the predetermined direction.

15. A micro-area processing machine for processing a surface of a sample using a probe and having the micro-positioning mechanism as set forth in claim 12.

16. A scanning probe microscope having a micro-probe for measuring the shape of a sample surface and various, physical properties of the sample, the scanning probe microscope having an electromagnetic power generating mechanism for producing a force which is linearly proportional to an electric power supplied thereto, spring elements for effecting fine displacement of the sample in a predetermined direction toward the probe in proportion to and in response to the force produced by the electromagnetic power generating mechanism, and means for controlling a coarse movement of the sample in the predetermined direction by controlling a viscosity of a viscous element.

17. A scanning probe microscope according to claim 16; wherein the means for controlling has a housing containing the viscous element, and a heating mechanism for heating the viscous element.

18. A scanning probe microscope having a micro-probe for measuring the shape of a sample surface and various physical properties of the sample, the scanning probe microscope having a fine moving mechanism including an electromagnetic power generating mechanism for producing a force which is linearly proportional to an electric power supplied thereto and spring elements for effecting fine displacement of the sample in a predetermined direction toward the probe in proportion to and in response to the force produced by the electromagnetic power generating mechanism, and a coarse moving mechanism for controlling a coarse movement of the sample in the predetermined direction by controlling a viscosity of a viscous element.

19. A scanning probe microscope according to claim 18; wherein the coarse moving mechanism comprises a fixed cylinder, a movable cylinder movably disposed within the fixed cylinder, the viscous element being disposed between the fixed cylinder and the moving cylinder, and a heating element for heating the viscous element.

20. A scanning probe microscope according to claim 19; wherein the heating element comprises an energizable heating element operative when energized for selectively effecting operation of the fine moving mechanism and the coarse moving mechanism.

21. A scanning probe microscope according to claim 20; wherein the energizable heating element effects operation of the fine moving mechanism when the heating element has a first temperature and effects operation of the coarse moving mechanism when the heating element has a second temperature higher than the first temperature.

22. A scanning probe microscope according to claim 19; further comprising means for controlling the temperature of the heating element to adjust the viscosity of the viscous element to thereby control a moving speed of the sample.

23. A scanning probe microscope according to claim 19; wherein the heating element is disposed on an outer side of the fixed cylinder for controlling the viscosity of the viscous element.

24. A scanning probe microscope according to claim 18; wherein the fine moving mechanism is integrally connected to the coarse moving mechanism as a single unit.

25. A micro-positioning mechanism for positioning a probe relative to a sample, the micro-positioning mechanism comprising: a support member supported through a viscous element for effecting coarse movement of a sample in a predetermined direction toward a probe; a heating device for heating the viscous element; and biasing means for effecting fine movement of the sample in the predetermined direction.

* * * * *